ANIMAL - TRAP.
Samuel Huffman.
**PATENTED
FEB 25 1868**
74759
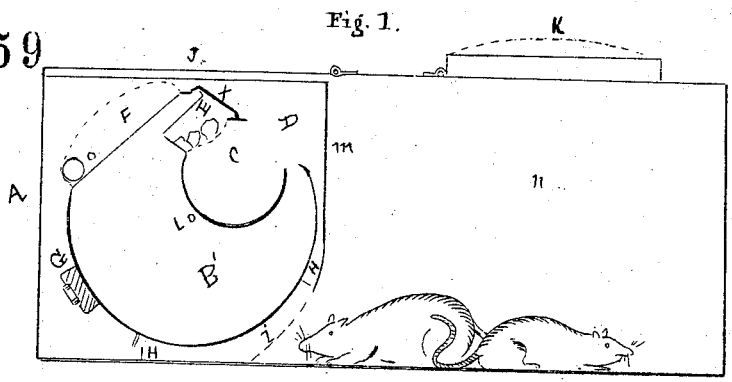
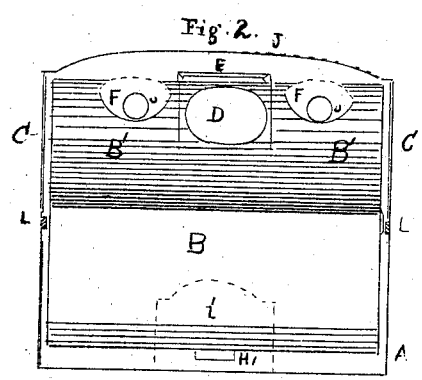
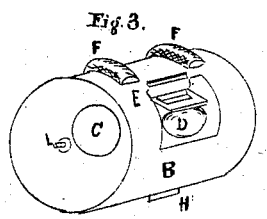
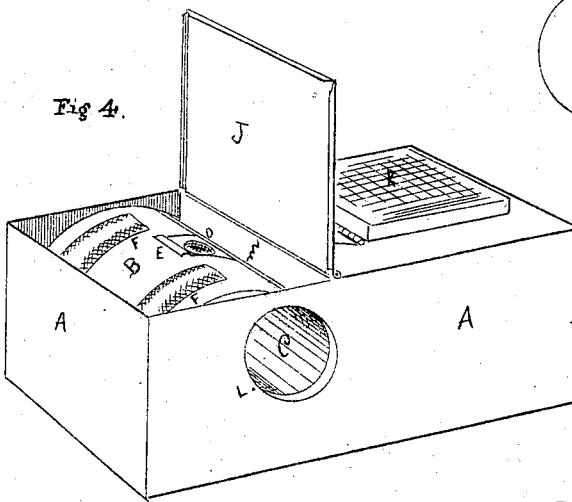
Witnesses.
D. C. Colby
C. F. Wilson
Samuel Huffman
Inventor.

United States Patent Office.

SAMUEL HUFFMAN, OF WESTFIELD, ILLINOIS.

Letters Patent No. 74,759, dated February 25, 1868.

---

IMPROVED ANIMAL-TRAP.

---

The Schedule referred to in these Letters Patent and making part of the same.

---

TO ALL WHOM IT MAY CONCERN:

Be it known that I, SAMUEL HUFFMAN, of Westfield, in the county of Clark, in the State of Illinois, have invented a new Improvement in Animal-Traps; and I do declare that the following is a full description thereof, and mode of operation, reference being had to the annexed drawings, making a part of this specification, in which—

Figure 4 is a perspective view.

Figure 2 is a cross-section of A A, and longitudinal section of B, fig. 4.

Figure 3, a perspective view of B, fig. 4.

Figure 1 is a longitudinal section of A A, fig. 4, and cross-section of B, fig. 4.

For convenience I use a cubical-formed box, having a partition, $m$, figs. 1 and 4, also two lids, one, as J, fig. 4, used as a cover, also to allow the cylinder B to be placed in and taken out at pleasure. Cap or lid K has wire over it, to admit light, and used for taking out the animal. In one chamber of A A, I place a cylinder on pivot L, figs. 3, 1, and 2, that it may turn easily. The cylinder has a chamber, B', in it, longitudinal between the centre and circumference, open at each end, shown at $c$, figs. 1, 3, and 4, and a sectional view, $c\ c$, fig. 2. There are corresponding holes on each side of box A A, opposite to C. Chamber B' has a hole in its side, shown at D, in the figures. The chambers F F are covered with any suitable substance. I here represent wire as shown at F, figs. 4 and 3. I also form a bait-holder, the bottom projecting into the hollow chamber B', shown at E, fig. 1, represented as open at F, fig. 3. The partition $m$ has a hole or opening through at the bottom, through which the animal passes from the hollow of B' into chamber $n$, fig. 1. The bait-holder should have a wire screen between the animal and bait, through which the animal can see and smell the bait, but cannot get it.

Operation.

Place bait in the pan E, close lid $x$, also J. The trap, when set, shows an opening entirely through it, looking from $c$ to $c$, through box A and cylinder or chamber B'. When the animal enters at $c$ to get the bait, its weight will move the cylinder in the direction of the arrow at D, until D arrives opposite $i$, stopped by H' at H', fig. 1. The opening in B' at $c$ is closed by the opposing sides of A, when D is at $i$; so, the animal finding its egress cut off, runs to escape, and passes through opening D and $i$, into chamber $n$. The chamber side of B being then lighter than the other half, causes the cylinder B to balance back, bringing D back to its former quiescent position shown at D, fig. 1, thus setting the trap for another animal. The animal which passed into $n$, finds its exit cut off at $i$ by the moving back of the cylinder, and is kept in $n$ until taken out through K. I use balls of lead, or any suitable substance, in cup or chamber G, fig. 1, for the purpose of counterbalance. In addition to the gravity of the animal, I use leaden balls, or any suitable substance, in any suitable form, (balls being the best,) to give additional weight to that side in which the animal is, for the purpose of bringing the hole D to $i$ much quicker. This is done as follows: The animal enters at $c$ into B', its weight moves B slightly in the segment of a circle, which changes position of chamber F, and the ball O rolls quickly to the opposite end of its chamber, and on the side, with the animal giving additional weight to that side, at a certain time, bringing it down quicker and farther than it would move without the ball. As the cylinder moves back the ball reverses position, and assists returning the trap to its former and proper position quicker after ball O passes the centre on the backward motion, when it is set. I use a cylinder, as I think to be the best form, suspended on pivots, and moving in a circular form, but do not confine myself strictly to the form laid down in drawings, as it can be easily varied. For instance, a square case, instead of cylinder, might be substituted, suspended from the arm of a balance, or more than one arm, and weights, as counterbalance, like scales, and having hollow arms. Balls might be used to roll from one side to the other of centre of gravity or fulcrum, and assist the animal in bringing its side down after the animal should escape. Counterbalance, as scales, would start the lighter side or cubic case up, and the ball or balls roll to the opposite side, and effect a similar object, as I use them in cylinder B, at F, in the figures.

Having shown my trap thus fully, I do not claim ensnaring animals by their own gravity, for that is well known; nor do I claim a platform on which the animal may place itself. An animal, in my opinion and experience, can be enticed into a place having a passage entirely through more easily than when one opening only is presented. Therefore, I use an enclosed case, having a chamber passing entirely through it.

I claim as new, and desire to secure by Letters Patent—

1. The pivoted chamber B, turning on its axis, furnished with two opposite openings, *c c*, and the lateral opening D, as and for the purpose specified, or equivalent.

2. I claim, in combination with revolving chamber B, the auxiliary balls, as described.

SAMUEL HUFFMAN.

Witnesses:
  D. C. CULLEY,
  C. F. WILSON.